United States Patent
Yun et al.

(10) Patent No.: US 11,201,328 B2
(45) Date of Patent: Dec. 14, 2021

(54) NICKEL ACTIVE MATERIAL PRECURSOR FOR LITHIUM SECONDARY BATTERY, METHOD FOR PRODUCING NICKEL ACTIVE MATERIAL PRECURSOR, NICKEL ACTIVE MATERIAL FOR LITHIUM SECONDARY BATTERY PRODUCED BY METHOD, AND LITHIUM SECONDARY BATTERY HAVING CATHODE CONTAINING NICKEL ACTIVE MATERIAL

(71) Applicant: Samsung SDI Co., Ltd., Yongin-si (KR)

(72) Inventors: Pilsang Yun, Yongin-si (KR); Jiyoon Kim, Yongin-si (KR); Wooyoung Yang, Yongin-si (KR); Donggyu Chang, Yongin-si (KR); Minah Cha, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 190 days.

(21) Appl. No.: 16/463,815

(22) PCT Filed: Dec. 4, 2017

(86) PCT No.: PCT/KR2017/014098
§ 371 (c)(1),
(2) Date: May 23, 2019

(87) PCT Pub. No.: WO2018/101807
PCT Pub. Date: Jun. 7, 2018

(65) Prior Publication Data
US 2019/0379044 A1   Dec. 12, 2019

(30) Foreign Application Priority Data
Dec. 2, 2016   (KR) .................. 10-2016-0163894

(51) Int. Cl.
| | | |
|---|---|---|
| H01M 4/525 | (2010.01) | |
| H01M 4/36 | (2006.01) | |
| H01M 4/505 | (2010.01) | |
| H01M 10/0525 | (2010.01) | |
| H01M 4/02 | (2006.01) | |

(52) U.S. Cl.
CPC ........... *H01M 4/525* (2013.01); *H01M 4/366* (2013.01); *H01M 4/505* (2013.01); *H01M 10/0525* (2013.01); *H01M 2004/021* (2013.01); *H01M 2004/028* (2013.01)

(58) Field of Classification Search
CPC ....... H01M 10/0525; H01M 2004/021; H01M 2004/028; C01G 53/006; C01G 53/04; C01G 53/42; C01G 53/50; C01P 2004/54; C01P 2004/61; C01P 2004/84; C01P 2006/12; C01P 2006/14; C01P 2006/40; Y02E 60/10; Y02P 70/50
See application file for complete search history.

(56) References Cited

U.S. PATENT DOCUMENTS

| | | | |
|---|---|---|---|
| 9,559,351 B2 | 1/2017 | Mori et al. | |
| 9,660,291 B2 | 5/2017 | Kim et al. | |
| 10,020,507 B2 | 7/2018 | Kobayashi et al. | |
| 2014/0050976 A1 | 2/2014 | Nagai | |
| 2015/0255789 A1* | 9/2015 | Bi | H01M 4/0471 429/223 |
| 2016/0218350 A1 | 7/2016 | Noh et al. | |
| 2017/0110726 A1* | 4/2017 | Aida | H01M 4/525 |
| 2017/0222221 A1 | 8/2017 | Park et al. | |
| 2018/0026267 A1 | 1/2018 | Kim et al. | |
| 2018/0108940 A1 | 4/2018 | Kwon et al. | |
| 2019/0326596 A1 | 10/2019 | Yun et al. | |
| 2020/0083530 A1 | 3/2020 | Yun et al. | |

FOREIGN PATENT DOCUMENTS

| | | |
|---|---|---|
| CN | 107359346 | * 11/2017 |
| EP | 2706599 A1 | 3/2014 |
| JP | 2001-243951 A | 9/2001 |
| JP | 2015-76397 A | 4/2015 |
| KR | 10-2013-0063868 A | 6/2013 |
| KR | 10-2013-0129449 A | 11/2013 |
| KR | 10-1593401 B1 | 2/2016 |
| KR | 10-2016-0049995 A | 5/2016 |
| KR | 10-2016-0129764 A | 11/2016 |

OTHER PUBLICATIONS

Machine translation of CN 107359346, published on Nov. 17, 2017 (Year: 2017).*
EPO Extended Search Report dated Jul. 3, 2020, for corresponding European Patent Application No. 17876857.8 (7 pages).
International Search Report for International Application No. PCT/KR2017/014098, dated Mar. 14, 2018, 2pp.

* cited by examiner

*Primary Examiner* — Anca Eoff
(74) *Attorney, Agent, or Firm* — Lewis Roca Rothgerber Christie LLP

(57) ABSTRACT

Provided are a nickel-based active material precursor for a lithium secondary battery including a porous core and a porous shell, wherein a porosity of the porous shell may be greater than a porosity of the porous core, and a dense intermediate layer may be disposed between the porous core and the porous shell, wherein a porosity of the dense intermediate layer may be lower than the porosity of the porous core and the porosity of the porous shell; a method of preparing the same; a nickel-based active material for a lithium secondary battery formed therefrom; and a lithium secondary battery containing a positive electrode including the same.

15 Claims, 3 Drawing Sheets

(A)  (B)  (C)

NICKEL ACTIVE MATERIAL PRECURSOR FOR LITHIUM SECONDARY BATTERY, METHOD FOR PRODUCING NICKEL ACTIVE MATERIAL PRECURSOR, NICKEL ACTIVE MATERIAL FOR LITHIUM SECONDARY BATTERY PRODUCED BY METHOD, AND LITHIUM SECONDARY BATTERY HAVING CATHODE CONTAINING NICKEL ACTIVE MATERIAL

CROSS-REFERENCE TO RELATED APPLICATION(S)

This application is a National Phase Patent Application of International Patent Application Number PCT/KR2017/014098, filed on Dec. 4, 2017, which claims priority of Korean Patent Application No. 10-2016-0163894, filed Dec. 2, 2016. The entire contents of both of which are incorporated herein by reference.

TECHNICAL FIELD

The present disclosure relates to a nickel-based active material precursor for a lithium secondary battery, a method of preparing the same, a nickel-based active material for a lithium secondary battery formed therefrom, and a lithium secondary battery containing a positive electrode including the same

BACKGROUND ART

As portable electronic devices, communication devices, and the like are developed, there is a great need to develop lithium secondary batteries having high energy density. As a positive active material of a lithium secondary battery, a lithium nickel manganese cobalt composite oxide, a lithium cobalt oxide, or the like may be used. However, in the case of using such a positive active material, as a result of repeated charging and discharging, cracks are generated in primary particles. Accordingly, the long lifespan of lithium secondary batteries may deteriorate, resistance may increase, and satisfactory capacity characteristics may not be attained. Therefore, in this regard, there is a need for improvement.

DESCRIPTION OF EMBODIMENTS

Technical Problem

Provided are a nickel-based active material for a lithium secondary battery and a precursor capable of providing the nickel-based active material, in which intercalation and deintercalation of lithium ions may be facilitated, resulting in an increase in a utilization rate, and relief of stress caused by volumetric expansion due to intercalation and deintercalation of lithium ions may be facilitated, resulting in an improved long lifespan.

Provided is a method of preparing the nickel-based active material precursor.

Provided is a lithium secondary battery including a positive electrode containing a nickel-based active material obtained from the nickel-based active material precursor.

Solution to Problem

According to an aspect of the present disclosure, a nickel-based active material precursor for a lithium secondary battery may include a porous core, a porous shell disposed on the porous core, and a dense intermediate layer disposed between the porous core and the porous shell, wherein a porosity of the porous shell may be greater than a porosity of the porous core, and a porosity of the dense intermediate layer may be lower than the porosity of the porous core and the porosity of the porous shell.

The dense intermediate layer and the porous shell may each have a radially arranged structure.

According to an aspect of the present disclosure, a method of preparing a nickel-based active material precursor for a lithium secondary battery may include a first step of forming a porous core; a second step of forming a dense intermediate layer on the porous core formed in the first step; and after removing a portion of a reaction product obtained in the second step to dilute the reaction product, a third step of forming a porous shell on the reaction product on which the dense intermediate layer is formed.

According to another aspect of the present disclosure, a nickel-based active material for a lithium secondary battery may be obtained from the nickel-based active material precursor.

According to another aspect of the present disclosure, a lithium secondary battery may contain a positive electrode including the nickel-based active material for a lithium secondary battery.

Advantageous Effects of Disclosure

When the nickel-based active material precursor for a lithium secondary battery is used, diffusion of lithium at an interface between a positive active material and an electrolytic solution may be facilitated, and a nickel-based active material, in which diffusion into an active material may be facilitated, may be obtained. When such a nickel-based active material is used, relief of stress caused by volumetric changes upon intercalation and deintercalation of lithium ions may be facilitated, and a diffusion distance of lithium ions may be reduced. A lithium secondary battery, using the nickel-based active material according to one or more embodiments as a positive active material, may have an increased utilization rate of lithium and increased capacity and lifespan through suppression of cracking of active materials while charging and discharging.

REFERENCE NUMERALS

10: NICKEL-BASED ACTIVE MATERIAL PRECURSOR 11: POROUS CORE
12: DENSE INTERMEDIATE LAYER 13: POROUS SHELL
21: LITHIUM SECONDARY BATTERY 22: NEGATIVE ELECTRODE
23: POSITIVE ELECTRODE 24: SEPARATOR
25: BATTERY CASE 26: CAP ASSEMBLY

MODE OF DISCLOSURE

With reference to the attached drawings, an exemplary nickel-based active material precursor for a lithium secondary battery, a nickel-based active material formed therefrom, a method of preparing the same, and a lithium secondary battery including a positive electrode including the same will be described in detail.

Figure 1A:
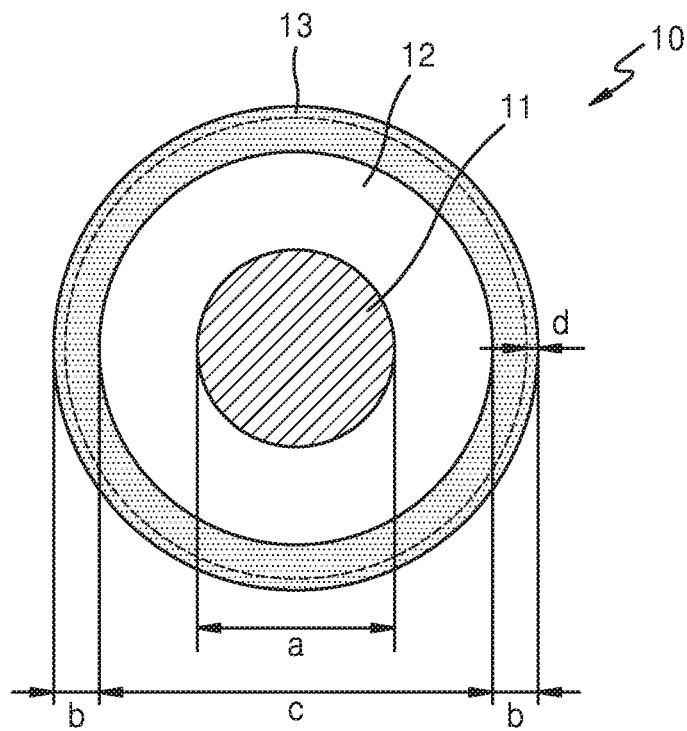
FIG. 1A is a schematic view illustrating a structure of a nickel-based active material according to an embodiment.
Figure 1B:
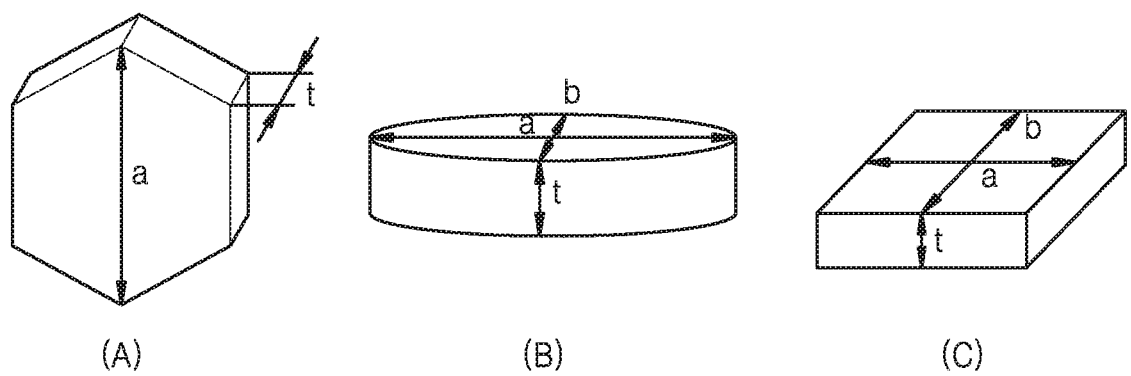
FIG. 1B is a schematic view illustrating a plate particle shape according to an embodiment.
Figure 1C:
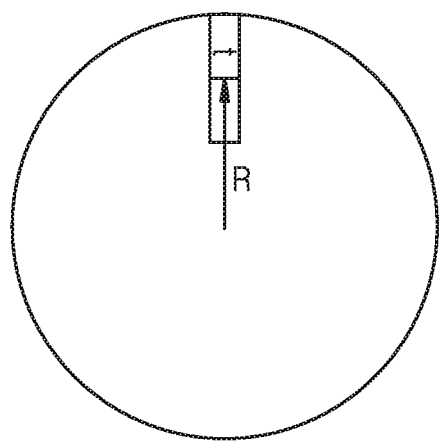
FIG. 1C is a schematic view for illustrating a definition of a radial shape in a nickel-based active material secondary particle.

Hereinafter, with references to FIGS. 1A to 1C, a nickel-based active material precursor according to one or more embodiments of the present disclosure will be described. FIG. 1A is a schematic view illustrating a structure of a nickel-based active material according to an embodiment; FIG. 1B is a schematic view illustrating a plate particle shape according to an embodiment; and FIG. 1C is a schematic view for illustrating a definition of a radial shape in a nickel-based active material secondary particle.

As shown in FIG. 1A, a nickel-based active material precursor 10 may include a porous core 11, a porous shell 13, and a dense intermediate layer 12 disposed between the porous core 11 and the porous shell 13. Porosity of the porous shell 13 may be greater than porosity of the porous core 11, and porosity of the dense intermediate layer 12 may be lower than that of the porous core 11 and that of the porous shell 13. A positive active material prepared from the nickel-based active material precursor including a porous structure according to one or more embodiments may have an increased specific surface area with an electrolytic solution, thereby facilitating diffusion of lithium from an active material to the electrolytic solution. Also, stress generated while charging and discharging may be effectively absorbed. In addition, due to the presence of the dense intermediate layer having low porosity, strength of the positive active material may not deteriorate.

The porous core 11 may occupy an area a which may correspond to about 65% of a length from a center of the nickel-based active material precursor 10 to a surface thereof. For example, about 3.2 micrometers (μm) from the center of the nickel-based active material precursor 10 may correspond to an area of the porous core.

The porous core 11 may have irregular porous pores. The term "irregular porous structure" as used herein refers to a structure having pores of which a size and a shape are not regular and are non-uniform.

The porous core 11 may include plate particles, and the plate particles may be arranged irregularly. As shown in FIG. 1B, the plate particles may each have a polygonal nanoplate shape such as a hexagonal shape as shown in (A), a nanodisc shape as shown in (B), and a cuboid shape as shown in (C). In FIG. 1B, a thickness t of each of the plate particles may be smaller than lengths a and b of plane directions. The length a of a plane direction may be equal to or greater than the length b of a plane direction. In each of the plate particles, a direction by which the thickness t is defined is referred to as a thickness direction, and a direction by which the lengths a and b are defined is referred to as a plane direction. Each of the plate particles may be arranged such that a thickness plane of the plate particle may be oriented toward a surface of a secondary particle. Here, a crystal plane, through which lithium ions may pass, may be exposed to a surface of the secondary particle. Here, the crystal plane, through which lithium ions may pass, refers to a thickness plane of a plate particle, i.e., a plane perpendicular to a (001) crystal plane of the lithium nickel-based active material precursor. The term "plate particle" as used herein refers to a particle in which a thickness may be smaller than a length of a major axis (a plane direction) of the plate particle. The length of a major axis may refer to a longest length of a largest plane of a plate particle. A plate particle refers to a small structure in which the length t of an axis direction (i.e., a thickness direction) may be smaller than the length a of a major axis of another direction (i.e., a plane direction).

The porous shell 13 may occupy an area b which may correspond to 15% to 35%, e.g., 33% of a length from an outermost surface, of a total distance from a center of the nickel-based active material precursor 10 to a surface thereof. For example, about 2 μm or less than 2 μm from an outermost surface of the nickel-based active material precursor 10 may correspond to an area of the porous shell.

A porosity of the porous shell 13 may be greater than 15% and 35% or less, and a porosity of the core may be in a range of 8% to 16%. According to one or more embodiments, in a structure, a porosity of the porous shell may be about two times greater than a porosity of the porous core.

A thickness of the porous shell 13 may be 2 μm or less, for example, 0.1 μm to 2 μm, or for example, 1 μm or 2 μm. The porous shell may include an irregular porous layer having a thickness d of 1 μm or less, for example, 0.1 μm to 1 μm, from a surface. As in the porous core 11 described above, the porous shell 13 may include plate particles. The plate particles may have a structure arranged in a given direction. For example, the plate particles may have a radially arranged structure. Referring to FIG. 1C, the term "radial(ly)" as used herein means that a direction of the thickness t of a plate may be arranged in a direction perpendicular to or within ±5° of a direction perpendicular to a direction R toward a center of the secondary particle.

The dense intermediate layer 12 may occupy an area c which may correspond to 65% to 85% of a length from a center of the nickel-based active material precursor to a surface thereof. For example, an area of a thickness in a range of 1.5 μm to 2 μm formed on the porous core 11 may correspond to the dense intermediate layer. The dense intermediate layer 12 may occupy an area in a range of 35% to 50% of a length based on the total length of porous core and dense intermediate layer.

The dense intermediate layer 12 may have a lower porosity and a higher density than the porous core 11 and the porous shell 13, A porosity of the dense intermediate layer 12 may be 5% or less, for example, in a range of 0.01% to 5%, for example 0.1% to 5%, or for example, 2% to 4.5%. Due to the presence of the dense intermediate layer having a low porosity between the porous core and the porous shell, a structure which may withstand the stress of shrinkage and expansion caused by charging and discharging is formed. Accordingly, lithium diffusion may be facilitated, and a density of the nickel-based active material precursor may be increased. Therefore, the nickel-based active material precursor may have a structure that may facilitate the relief of stress caused by volumetric change due to charging and discharging.

A specific surface area of the nickel-based active material precursor 10 may be 8 square meters per gram (m²/g) or higher, for example, in a range of 8.0 m²/g to 10.0 m²/g. As such, due to a large specific surface area of the nickel-based active material precursor, lithium diffusion may be facilitated.

The nickel-based active material precursor may be a compound represented by Formula 1:

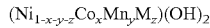

$(Ni_{1-x-y-z}Co_xMn_yM_z)(OH)_2$   Formula 1 wherein, in Formula 1, M may be an element selected from the group consisting of boron (B), magnesium (Mg), calcium (Ca), strontium (Sr), barium (Ba), titanium (Ti), tungsten (W), vanadium (V), chromium (Cr), iron (Fe), copper (Cu), zirconium (Zr), and aluminum (Al), and $$x \leq (1-x-y-z), y \leq (1-x-y-z), z \leq (1-x-y-z), 0 < x < 1, 0 \leq y < 1, \text{ and } 0 \leq z < 1.$$

In Formula 1, $0 < x \leq \frac{1}{3}$, $0 \leq y \leq 0.5$, $0 \leq z \leq 0.05$, and $\frac{1}{3} \leq (1-x-y-z) \leq 0.95$.

In the compound represented by Formula 1, a content of nickel may be greater than that of cobalt, and a content of nickel may be greater than that of manganese. In Formula 1, $0 < x \leq \frac{1}{3}$, $0 \leq y \leq 0.5$, $0 \leq z \leq 0.05$, and $\frac{1}{3} \leq (1-x-y-z) \leq 0.95$. In some embodiments, in Formula 1, x may be in a range of 0.1 to 0.3, y may be in a range of 0.05 to 0.3, and z may be 0. In some embodiments, in Formula 1, in a case where $0 < z \leq 0.05$, M may be aluminum.

The nickel-based active material precursor may be, for example, $Ni_{0.6}Co_{0.2}Mn_{0.2}(OH)_2$, $Ni_{0.5}Co_{0.2}Mn_{0.3}(OH)_2$, $Ni_{1/3}Co_{1/3}Mn_{1/3}(OH)_2$, $Ni_{0.8}Co_{0.1}Mn_{0.1}(OH)_2$, or $Ni_{0.85}Co_{0.1}Al_{0.05}(OH)_2$.

Hereinafter, a method of preparing the nickel-based active material precursor according to one or more embodiments will be described in detail.

The nickel-based active material precursor according to one or more embodiments may be prepared by performing a first step of forming a porous core, a second step of forming a dense intermediate layer on the porous core, and after diluting a reaction product obtained in the second step, a third step of forming a porous shell. When the method of preparing according to the present example is used, a nickel-based active material precursor may be prepared, in which pores may be properly maintained such that structural stability may be excellent, and a diffusion distance of lithium may be effectively controlled.

A core structure in the nickel-based active material precursor according to one or more embodiments may be influenced by a feeding rate of a metal raw material, a concentration of a complexing agent, and a pH of a reaction mixture.

In the first step, the second step, and the third step, a reaction temperature may be in a range of 40° C. to 60° C., a stirring power may be in a range of 0.5 to kilowatt per cubic meter (kW/m$^3$) to 6.0 kW/m$^3$, and a pH may be controlled to be in a range of 10 to 12.

In the method, a stirring power of the reaction mixture in a reactor may gradually decrease from the first step to the second step and from the second step to the third step. When a stirring power is gradually decreased, a nickel-based active material precursor having a desired size and structure may be easily obtained.

According to one or more embodiments, a stirring power of the reaction mixture in the first step may be in a range of 2.5 kW/m$^2$ to 6.0 kW/m$^2$. For example, a stirring power in the first step may be greater than 2.5 kW/m$^2$ and 3.5 kW/m$^2$ or lower. A stirring power of the reaction mixture in the second step may be 2.5 kW/m$^2$ or lower. For example, a stirring power in the second step may be greater than 2.0 kW/m$^2$ and 2.5 kW/m$^2$ or lower. A stirring power of the reaction mixture in the third step may be 1.5 kW/m$^2$ or greater and 2.0 kW/m$^2$ or lower. A pH of the reaction mixture may gradually decrease from the first step to the second step and from the second step to the third step. According to one or more embodiments, from the first step to the second step and from the second step to the third step, a pH of the reaction mixture may be controlled to be in a range of 10.0 to 12.0 at a reaction temperature of 50° C. At a reaction temperature of 50° C., a pH of the reaction mixture in the third step may be controlled to decrease by a degree in a range of 1.1 to 1.6 from the pH of the reaction mixture in the first step. For example, at a reaction temperature of 50° C., a pH of the reaction mixture in the third step may be controlled to be decreased by 1.2 to 1.5 from the pH of the reaction mixture in the first step. According to one or more embodiments, at a reaction temperature of 50° C., a pH in the second step may be controlled to be decreased by 0.55 to 0.85 from the pH in the first step. A pH in the second step may be controlled to be decreased by 0.35 to 0.55 from the pH in the second step.

According to the method of preparing a nickel-based active material precursor, a concentration of a complexing agent in the second step may be increased relative to a concentration of a complexing agent in the first step. A concentration of the complexing agent in the third step may be reduced relative to a concentration of the complexing agent in the second step.

According to the method of preparing a nickel-based active material precursor, a growth rate of a nickel-based active material precursor particle in the second step may be equal to or increased by 20% relative to a growth rate of the nickel-based active material precursor particle in the first step. The method may include diluting the reaction product such that a growth rate of the nickel-based active material precursor particle in the third step may be two times or two times greater than a growth rate of the nickel-based active material precursor particle in the second step.

To control the growth rate, an input amount of a metal raw material for particle growth in the second step may be increased by 15% to 35%, for example, about 20% to 30%, relative to an input amount of a metal raw material in the first step. An input of a metal raw material for particle growth in the third step may be increased by 20% to 35%, for example, about 25% to 30%, relative to the input in the second step. Here, the method may include a process of increasing a density of particles by increasing an input of ammonia water in the second step by 10% to 30%, for example, about 15% to 25%, relative to an input of ammonia water in the first step.

To obtain a nickel-based active material precursor, a first step of forming a porous core may be performed by adding a metal raw material for forming an active material precursor and a complexing agent at a given rate, while controlling pH. Subsequently, a second step of forming a dense intermediate layer, which has an orientation from the center to the outside, may be performed on the porous core obtained from the first step by changing reaction conditions. Subsequently, a portion of a reaction product obtained in the second step may be removed to dilute the reaction product in a reactor.

Next, a third step of increasing a growth rate of particles may be performed by reducing a concentration of the reaction mixture to form a porous shell on the dense intermediate layer formed in the second step, thereby obtaining a nickel-based active material precursor for a lithium secondary battery.

A pH adjusting agent may serve to lower a solubility of metal ions in a reactor such that metal ions may be precipitated as a hydroxide. Examples of the pH adjusting agent include ammonium hydroxide, sodium hydroxide (NaOH), sodium carbonate ($Na_2CO_3$), and the like. For example, the pH adjusting agent may be sodium hydroxide (NaOH).

A complexing agent may serve to control a rate of precipitate formation during coprecipitation. The complexing agent may be ammonium hydroxide (NH$_4$OH, ammonia water), citric acid, acrylic acid, tartaric acid, or glycolic acid. A content of the complexing agent may be used at a common level. According to an embodiment, a complexing agent may be, for example, ammonia water.

A feeding rate of a metal raw material in the first step may be in a range of 1.0 liters per hour (L/hr) to 10.0 L/hr, for example, 2 L/hr to 7 L/hr. A feeding rate of a complexing agent may be 0.3 times to 0.6 times a molar feeding rate of the metal raw material. In this embodiment, in the reactor, a reaction temperature may be maintained in a range of 40° C. to 60° C., a pH may be maintained in a range of 11.0 to 12.0, and a stirring power may be maintained in a range of 2.0 kW/m to 4.0 kW/m$^3$. A content of ammonia water in the first step, the second step, and the third step may be in a range of 0.3 M to 0.6 M.

After performing the first step, the second step may be performed, in which a growth rate in the second step may be maintained at the same level as in the first step or increased by 20% or greater relative to the first step. When the second step is performed, a dense intermediate layer having an orientation from the center to the outside may be formed. In the second step, a feeding rate of a metal raw material may be 1.5 times or greater, for example, 1.5 times to 2.5 times greater, relative to a feeding rate of a metal raw material in the first step. In the second step, a concentration of a complexing agent in a reactor may be greater by 0.05 M or more, for example, 0.05 M to 0.15 M greater, relative to a concentration of a complexing agent in the first step. In the second step, a stirring power may be 0.5 kW/m$^3$ to 1.0 kW/m$^3$ lower than that of the first step. In the second step, a pH may be 0.4 to 0.9 lower, for example, about 0.5 to 0.7 lower than that of the first step.

In the second step, when an average diameter (D50) reaches 9 μm to 12 μm, the third step may be subsequently performed. In the third step, to increase a growth rate of particles by 2 times or greater, for example, 3 times or greater, relative to the second step, a portion of the reaction product in the reactor, which has gone through the second step, may be removed to dilute a concentration of the reaction product in the reactor. The product removed from the reactor may be used in another reactor.

In the third step, precipitate may rapidly grow, thereby forming a surficial porous shell of the nickel-based active material precursor. Accordingly, reaction conditions of the third step and a final average diameter (D50) in the second step may greatly influence to a surface depth of a porous layer in the nickel-based active material precursor.

According to the method of preparing a nickel-based active material precursor, a concentration of a complexing agent in the second step may be increased relative to a concentration of a complexing agent in the first step. A concentration of the complexing agent in the third step may be reduced relative to a concentration of the complexing agent in the second step.

When a nickel-based active material precursor is prepared according to the first step reaction, a reaction rate of the nickel-based active material precursor may be high. A complexing agent may be added to a reactor, and a metal raw material and an additional complexing agent may be added to perform a reaction. To adjust the pH of a mixture in the reactor, a pH adjusting agent may be added thereto to perform a reaction.

A feeding rate of a metal raw material may be in a range of 1 L/hr to 10 L/hr, for example 5 L/hr to 8 L/hr, and a feeding rate of ammonia may be in a range of 0.1 L/hr to 1.0 L/hr, for example, 0.5 L/hr to 1.0 L/hr. A pH of the reaction mixture may be controlled to be within 10 to 12. A reaction temperature may be in a range of 40° C. to 60° C.

A metal raw material in the preparation process according to the third step reaction may be a corresponding metal precursor in consideration of a composition of a nickel-based active material precursor. The metal raw material may be a metal carbonate, a metal sulfate, a metal nitrate, a metal chloride, or the like.

When the nickel-based active material precursor according to one or more embodiments is used, a nickel-based active material may be obtained. The nickel-based active material according to one or more embodiments may be, for example, a compound represented by Formula 2:

$$Li_a(Ni_{1-x-y-z}Co_xMn_yM_z)O_2 \qquad \text{Formula 2}$$

wherein, in Formula 2, M may be an element selected from the group consisting of boron (B), magnesium (Mg), calcium (Ca), strontium (Sr), barium (Ba), titanium (Ti), tungsten (W), vanadium (V), chromium (Cr), iron (Fe), copper (Cu), zirconium (Zr), and aluminum (Al), and $1.0 \leq a \leq 1.3$, $x \leq (1-x-y-z)$, $y \leq (1-x-y-z)$, $0 < x < 1$, $0 \leq y < 1$, and $0 \leq z < 1$.

In the compound represented by Formula 2, a content of nickel may be greater than that of cobalt, and a content of nickel may be greater than that of manganese. In Formula 2, $1.0 \leq a \leq 1.3$, $0 < x \leq 1/3$, $0 \leq y \leq 0.5$, $0 \leq z \leq 0.05$, and $1/3 \leq (1-x-y-z) \leq 0.95$.

In some embodiments, in Formula 2, a may be, for example, in a range of 1 to 1.1, x may be in a range of 0.1 to 0.3, y may be in a range of 0.05 to 0.3, and z may be 0.

In some embodiments, in Formula 2, in a case where $0 < z \leq 0.005$, M may be aluminum.

A content of nickel in the nickel-based active material according to one or more embodiments may be 1/3 to 0.95 mol %, for example, 50 mol % to 90 mol %, or for example, 60 mol % to 85 mol %, relative to a total content of transition metals. A total content of transition metals may indicate a total content of nickel, cobalt, and manganese in Formula 2.

The nickel-based active material may be, for example, $LiNi_{0.6}Co_{0.2}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, or $LiNi_{0.85}Co_{0.1}Al_{0.05}O_2$.

In the nickel-based active material according to one or more embodiments, due to the porous core, migration distances of lithium ions and electrons from an outer side to a central portion thereof may be reduced, intercalation and deintercalation of lithium ions may be facilitated, and electron transfer may also be facilitated. In addition, in such a nickel-based active material, in the case of volumetric changes upon charge/discharge, a central porous layer may serve as a buffer, thereby reducing stress on active materials. Accordingly, even if its nickel content is not increased, the nickel-based active material according to one or more embodiments may have capacity characteristics superior to the same composition.

The method of preparing a nickel-based active material using the nickel-based active material precursor according to one or more embodiments will be described as follows.

A lithium precursor and a nickel-based active material precursor may be mixed at a predetermined molar ratio and subjected to a primary heat treatment (low-temperature heat treatment) in a range of 600° C. to 800° C., thereby preparing a nickel-based active material.

The lithium precursor may be, for example, lithium hydroxide, lithium fluoride, lithium carbonate, or a mixture thereof. The mixing ratio of the lithium precursor to the nickel-based active material precursor may be, for example, stoichiometrically controlled to thereby prepare the nickel-based active material represented by Formula 2.

The mixing may be dry-mixing and performed using a mixer or the like.

The dry-mixing may be performed by using a milling method. In this embodiment, regarding milling conditions, milling may be performed such that a precursor used as a starting material may not undergo deformation such as pulverization To this end, a size of the lithium precursor mixed with the nickel-based active material precursor may be controlled in advance. An average diameter of the lithium precursor may be in a range of 5 μm to 15 μm, for example, about 10 μm. A lithium precursor having such a size and the nickel-based active material precursor may be milled at a rate in a range of 300 revolutions per minute (rpm) to 3,000 rpm to obtain the desired mixture.

In the milling process, when a temperature inside the mixer is 30° C. or higher, a cooling process may be performed thereon such that the temperature inside the mixer is room temperature (25° C.).

The low-temperature heat treatment may be performed under an oxidative gas atmosphere. The oxidative gas atmosphere may use an oxidative gas such as oxygen or air. For example, the acidic gas may be composed of 10 volume % (vol %) to 20 volume % of oxygen or air and 80 vol % to 90 vol % of an inert gas.

The low-temperature heat treatment may be performed at a temperature lower than a densification temperature, while a reaction of the lithium precursor and the nickel-based active material precursor proceeds. In this embodiment, the densification temperature refers to a temperature that allows sufficient crystallization, thus realizing charge capacity of an active material.

The low-temperature heat treatment may be performed, for example, at a temperature range from 600° C. to 800° C., in particular, from 650° C. to 800° C.

The low-temperature heat treatment may be performed, for example, 3 hours to 10 hours, however, the duration may vary depending on a temperature of the heat treatment or the like.

The nickel-based active material secondary particle may suppress exhaustion and be subjected to secondary heat treatment (i.e., high-temperature heat treatment) under an oxidative gas atmosphere.

The high-temperature heat treatment may be performed, for example, at a temperature range from 700° C. to 900° C. The high-temperature heat treatment may be performed, for example, for 3 hours to 10 hours, however, the duration may vary depending on a temperature of the high-temperature heat treatment or the like.

When an active material is discharged, at the end of the discharge, a diffusion rate of lithium may be lowered, and when a size of the nickel-based active material secondary particle is large, a discharge capacity may be small relative to a charge capacity due to the resistance of permeation of lithium into the nickel-based active material secondary particle, thus deteriorating charging and discharging efficiency. However, since an internal portion of the nickel-based active material secondary particle according to one or more embodiments has a porous structure, the diffusion distance toward the inside may be reduced, and an external portion thereof may be arranged in a radial direction toward a surface, thereby facilitating intercalation of lithium into the surface. Also, since a size of the nickel-based active material primary particle is small, a lithium transfer pathway may be easily secured among crystal grains. In addition, the central porous layer may disperse stress caused by volumetric changes upon charging and discharging, thereby preventing the occurrence of cracks.

The nickel-based active material according to one or more embodiments may include plate particles (or rod particles), and a major axis of the plate particles may be arranged in a radial direction.

An internal portion of a nickel-based active material prepared from the nickel-based active material precursor according to one or more embodiments may have a porous structure and a shell thereof may have a radially arranged structure.

The internal porous structure may be an irregular porous structure. A core (an internal portion) may have a closed pore having a size of 150 nanometers (nm) or less, for example, 25 nm to 148 nm, toward the central portion. The nickel-based active material according to one or more embodiments may include plate particles, and a major axis of each of the plate particles may be arranged in a radial direction.

The nickel-based active material may be, for example, a secondary particle containing an external portion having a radially arranged structure and an internal portion having an irregular porous structure, in which the internal portion of the secondary particle may have a larger pore size than the external portion thereof. The term "pore size" refers to an average diameter of a pore that is spherical or circular in shape. When a pore is oval in shape, a pore size refers to a length of a major axis thereof.

A closed pore and/or an open pore may be present in the shell of the nickel-based active material. An isolated pore may be present in a core of a nickel-based active material, and thus it may be difficult for electrolytes or the like to be included therein. However, when an open pore is present in a shell of a nickel-based active material, the porous core may contain electrolytes or the like.

A nickel-based active material obtained from the nickel-based active material precursor may include plate particles, and a major axis of each of the plate particles may be arranged in a radial direction, and an aspect ratio of each of the plate particles may be in a range of 1:3 to 1:20.

A core (an internal portion) may have a closed pore having a size of 150 nm or less, for example, 25 nm to 148 nm, toward the central portion. The nickel-based active material according to one or more embodiments may include plate particles, and a major axis of each of the plate particles may be arranged in a radial direction.

An average length of each of the plate particles including the shell (the external portion) and the core (the internal portion) may be in a range of 150 nm to 500 nm, for example, 200 nm to 380 nm, and in particular, 290 nm to 360 nm. An average length refers to an average value of an average length of a major axis and an average length of a minor axis in a plane direction of a plate particle.

An average diameter of each of the plate particles including the external portion and the internal portion may be in a range of 100 nm to 200 nm, for example, 120 nm to 180 nm, and in particular, 130 nm to 150 nm. A ratio of an average thickness to an average length may be in a range of 1:2 to 1:10, for example 1:2.1 to 1:5, and in particular, 1:2.3 to 1:2.9. As such, when an average length, an average thickness, and a ratio of the average thickness to the average length are within the aforementioned ratios, and a size of each of the plate particles are small and the nickel-based active material primary particles are radially arranged on the outside, relatively many lithium diffusion pathways among grain boundaries near the surface and many crystal planes capable of transferring lithium to the outside may be exposed, thereby improving a lithium diffusivity and securing high initial efficiency and large capacity. In addition, when the plate primary particles are radially arranged, the pores exposed on surfaces therebetween may be toward a central direction, thereby facilitating lithium diffusion from the surfaces. Upon intercalation and deintercalation of lithium, uniform shrinkage and expansion may be possible due to the radially arranged primary particles. Upon deintercalation of lithium, pores may be present near a (001) crystal plane direction, i.e., a direction in which particles may expand, such that buffering action is enabled. Since the size of each of plate primary particles is small, cracks may be less likely to be formed upon shrinkage and expansion. The internal pores may additionally ease volumetric change, and thus cracks between the primary particles may be less likely to be formed upon charge/discharge, thereby improving lifespan characteristics and reducing an increase in resistance.

In the nickel-based active material according to one or more embodiments, a size of the internal pore may be 150 nm to 1 μm, and a size of the external pore may be 150 nm or less. In the internal portion of the nickel-based active material, closed pores may be present. In the external portion of the nickel-based active material, closed pore and/or open pores may be present. The closed pores may not include electrolytes or the like, whereas the open pores may contain electrolytes or the like. The term "closed pore" as used herein refers to an independent pore in which wall surfaces of the pore are all closed, and which is not connected to other pores. The term "open pore" as used herein refers to a continuous pore in which at least a portion of wall surfaces are open, and which is connected to other pores.

For example, the nickel-based active material particle may have open pores each having a size of less than 150 nm toward a central portion thereof.

Hereinafter, a method of preparing a lithium secondary battery, having a positive electrode including the nickel-based active material according to one or more embodiments; a negative electrode; a nonaqueous electrolyte containing a lithium salt; and a separator, will be described in detail. The positive electrode and the negative electrode may each be prepared by coating and drying a composition for forming a positive active material layer and a composition for forming a negative active material layer on each current collector.

The composition for forming a positive active material may be prepared by mixing a positive active material, a conductive agent, a binder, and a solvent. The positive active material according to one or more embodiments may be used as the positive active material.

The binder is a component which may assist in bonding of an active material to a conductive agent and to a current collector and may be added in an amount of 1 part to 50 parts by weight based on 100 parts by weight of the positive active material. Examples of such a binder include polyvinylidene fluoride, polyvinyl alcohol, carboxymethyl cellulose (CMC), starch, hydroxypropyl cellulose, reproduced cellulose, polyvinylpyrrolidone, tetrafluoroethylene, polyethylene, polypropylene, ethylene propylene diene terpolymer (EPDM), sulfonated EPDM, styrene butylene rubber, fluorine rubber, and various copolymers. When a content of the binder is within the foregoing range, the binding force of an active material layer to a current collector may be satisfactory.

The conductive agent may be any suitable material having suitable electrical conductivity without causing an undesirable chemical change in a battery. Examples of the conductive agent include graphite, such as natural graphite or artificial graphite; a carbonaceous material, such as carbon black, acetylene black, Ketjen black, channel black, furnace black, lamp black, or summer black; conductive fibers, such as carbon fibers or metal fibers; fluorinated carbon; metal powder of aluminum or nickel; conductive whiskers, such as zinc oxide or potassium titanate; a conductive metal oxide, such as titanium oxide; and a conductive material, such as a polyphenylene derivative.

An amount of the conductive agent may be in a range of about 0.1 parts to about 5 parts by weight based on 100 parts by weight of the positive active material. When an amount of the conductive agent is within this range, conductivity characteristics finally obtained may be excellent.

An example of the solvent may be N-methyl pyrrolidone.

An amount of the solvent may be in a range of about 10 parts to about 100 parts by weight based on 200 parts by weight of the positive active material. When the amount of the solvent is within this range, a process for forming the negative active material layer may be performed efficiently.

The positive electrode current collector is not particularly limited and may be any suitable material as long as the positive electrode current collector has a thickness in a range of 3 μm to 500 μm and suitable electrical conductivity without causing undesirable chemical change in a battery. Examples of the positive electrode current collector include stainless steel, aluminum, nickel, titanium, and sintered carbon; and aluminum or stainless steel each being surface-treated with carbon, nickel, titanium, or silver. The positive electrode current collector may be processed to have fine bumps on surfaces thereof to enhance a binding force of the positive active material to the current collector. The positive electrode current collector may be used in any of various suitable forms including a film, a sheet, a foil, a net, a porous structure, a foam, and a non-woven fabric.

Separately, a negative active material, a binder, a conductive agent, and a solvent may be mixed to prepare a composition for forming a negative active material layer.

Non-limiting examples of the negative active material include graphite, a carbonaceous material such as carbon, lithium metal, an alloy thereof, and a silicon oxide-based material. In some embodiments, silicon oxide may be used as a negative electrode active material.

The binder, the conductive agent, and the solvent may respectively be the same material used in the same amount in preparing the positive electrode. The negative electrode current collector may have a thickness in a range of 3 μm to 500 μm. The negative electrode current collector is not particularly limited and may be any suitable material as long as the negative electrode current collector has suitable electrical conductivity without causing undesirable chemical change in a battery. Examples of the negative electrode current collector may include copper, stainless steel, aluminum, nickel, titanium, and sintered carbon; copper or stainless steel each being surface-treated with carbon, nickel, titanium, or silver; and an aluminum-cadmium alloy. In addition, like the positive electrode current collector, the negative electrode current collector may be processed to have fine bumps on surfaces of the negative electrode current collector to enhance a binding force of the negative active material to the current collector. The negative electrode current collector may be used in any of various suitable forms including a film, a sheet, a foil, a net, a porous structure, a foam, and a non-woven fabric.

A separator may be disposed between the positive electrode and the negative electrode, each prepared according to the foregoing process.

The separator may have a pore diameter of 0.01 μm to 10 μm and a thickness of 5 μm to 300 μm. In particular, the separator may include, for example, an olefin-based polymer, such as polypropylene or polyethylene; or a sheet or non-woven fabric formed of glass fibers. When a solid electrolyte, such as a polymer, is used as an electrolyte, the solid electrolyte may also serve as a separator.

When a nonaqueous electrolyte containing a lithium salt may be constituted of a nonaqueous electrolyte solution and a lithium salt. As a nonaqueous electrolyte, a nonaqueous electrolyte solution, an organic solid electrolyte, an inorganic solid electrolyte, or the like may be used.

Non-limiting examples of the nonaqueous electrolyte solution may include an aprotic organic solvent, such as N-methyl pyrollidinone, propylene carbonate, ethylene carbonate; butylene carbonate, dimethyl carbonate, diethyl carbonate, gamma-butyrolactone, 1,2-dimethoxy ethane, 2-methyl tetrahydrofuran, dimethyl sulfoxide, 1,3-dioxolane, RN-formamide, N,N-dimethyl formamide, dioxolane, acetonitrile, nitromethane, methyl formate, methyl acetate, triester phosphate, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, ethyl propionate, or the like.

Non-limiting examples of the organic solid electrolyte may include a polyethylene derivative, a polyethylene oxide derivative, a polypropylene oxide derivative, a phosphoric ester polymer, a polyester sulfide; a polyvinyl alcohol, a polyvinylidene difluoride; and the like.

Non-limiting examples of the inorganic solid electrolyte may include $Li_3N$, $LiI$, $Li_5NI_2$, $Li_3N$—$LiI$—$LiOh$, $Li_2SiS_3$, $Li_4SiO_4$, $Li_4SiO_4$—$LiI$—$LiOH$, $Li_3PO_4$—$Li_2S$—$SiS_2$, and the like.

The lithium salt may be soluble in the nonaqueous electrolyte. Non-limiting examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, $(FSO_2)_2NLi$, lithium chloroborate, a lower aliphatic carboxylic acid lithium, tetraphenylborate lithium imides, and the like.

Figure 2:
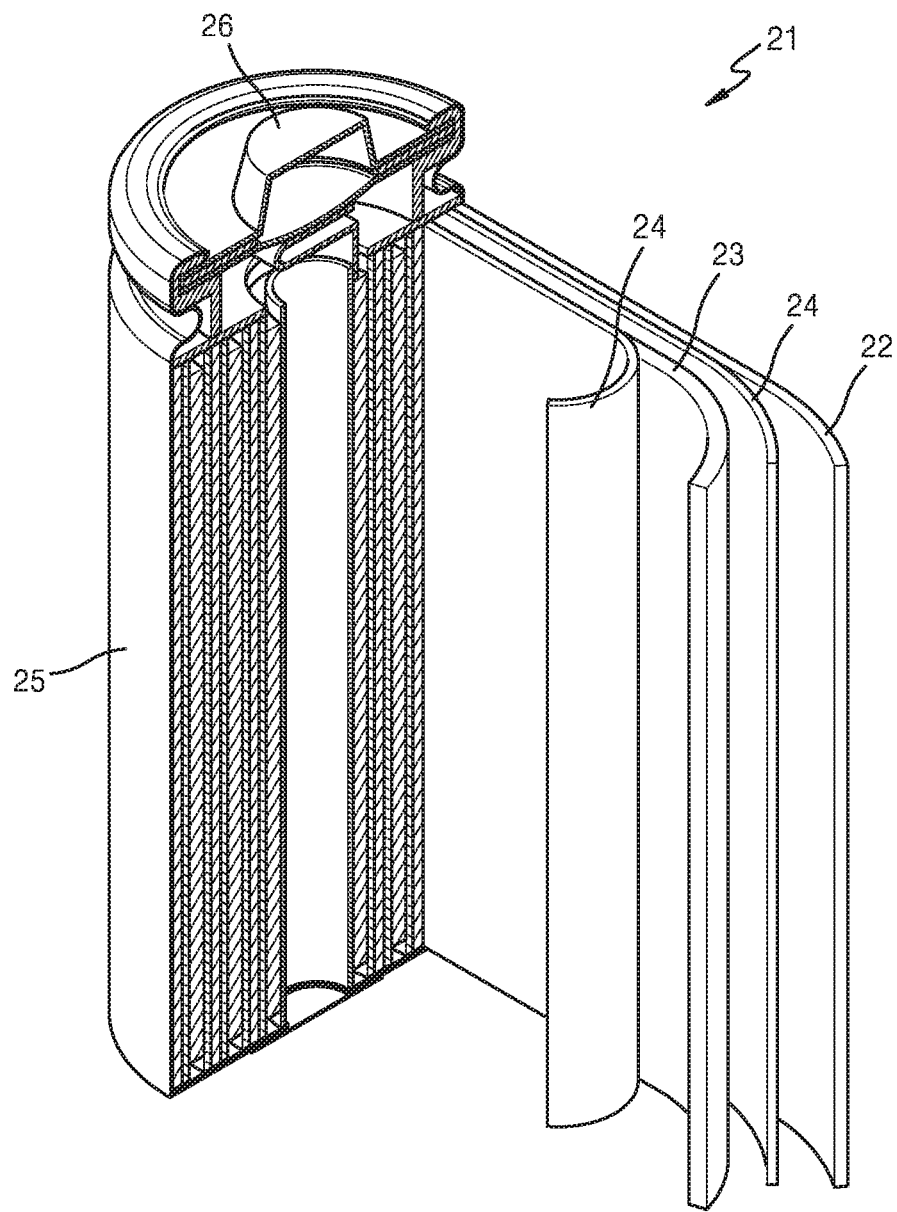
FIG. 2 is a schematic view illustrating a structure of a lithium secondary battery according to an embodiment.

FIG. 2 is a schematic view illustrating a representative structure of a lithium secondary battery according to an embodiment.

Referring to FIG. 2, a lithium secondary battery 21 may include a positive electrode 23, a negative electrode 22, and a separator 24. The positive electrode 23, the negative electrode 22, and the separator 24 may be wound or folded, and then sealed in a battery case 25. The battery case 25 may then be filled with an organic electrolyte solution and hermetically sealed with a cap assembly 26, thereby completing the manufacture of the lithium secondary battery 21. The battery case 25 may be a cylindrical type, a rectangular type, or a thin-film type. For example, the lithium secondary battery 21 may be a large thin-film-type battery. The lithium secondary battery may be a lithium-ion battery. The separator may be disposed between the positive electrode and the negative electrode to provide a battery assembly. The battery assembly may be stacked in a bi-cell structure and impregnated with an electrolyte solution, and put into a pouch and hermetically sealed; thereby completing the manufacture of a lithium-ion polymer battery. In one or more embodiments, a plurality of battery assemblies may be stacked to form a battery pack, which may be used in a device that requires large capacity and high power. For example, the battery pack may be used in a laptop computer, a smart phone, or an electric vehicle.

The lithium secondary battery may have improved storage stability at a high temperature, high-rate characteristics, and lifespan characteristics, and thus may be applied to an electric vehicle (EV), for example, in a hybrid vehicle, such as a plug-in hybrid electric vehicle (PHEV).

Hereinafter embodiments will be described in detail with reference to Examples and Comparative Examples. These examples are for illustrative purposes only and are not intended to limit the scope of the inventive concept.

Preparation Example 1

Preparation of Nickel-Based Active Material Precursor

A nickel-based active material precursor ($Ni_{0.6}Co_{0.2}Mn_{0.2}(OH)_2$) was synthesized through the following coprecipitation method. In the following preparation method, metal raw materials for forming the nickel-based active material precursor were nickel sulfate ($NiSO_4 \cdot 6H_2O$), cobalt sulfate ($CoSO_4 \cdot 7H_2O$), and manganese sulfate ($MnSO_4 \cdot H_2O$).

[First step: 3.0 kW/m³, $NH_3$ 0.5 M, pH 11.0 to 12.0]

First, ammonia water ($NH_3$) having a concentration of 0.5 mol/L (M) was added to a reactor. A reaction was started at a stirring power 3.0 kW/m³ and at a reaction temperature of 50° C. Then, metal raw materials (nickel sulfate, cobalt sulfate, and manganese sulfate) were added thereto at 5.0 L/hr, and ammonia water was added thereto at 0.5 L/hr. Subsequently, sodium hydroxide (NaOH) was added thereto to maintain a pH. The pH in the reactor was in a range of 11.0 to 12.0. The reaction was carried out within this pH range for 6 hours.

[Second step: 2.5 kW/m³, $NH_3$ 6 M, pH 10.0 to 11.0]

After performing the reaction, the stirring power in the reactor was reduced to 2.5 kW/m³, and metal raw materials were added thereto at 6.5 L/hr and ammonia water was added thereto at 1.5 L/hr. Here, the pH in the reactor was controlled to be in a range of 10.0 to 11.0. This process was repeatedly performed until an average diameter D50 of the particles in the reactor reached about 10 μm. Subsequently, a portion of the product resulting from the second step was removed from the reactor.

[Third step: 2.0 kW/m³, $NH_3$ 0.4 M, pH 10.0 to 11.0]

When the average diameter (D50) of the particles in the reactor reached about 10 μm, the stirring power in the reactor was reduced to 2.0 kW/m³, and at a temperature of about 50° C., a reaction was carried out.

Metal raw materials (nickel sulfate, cobalt sulfate, and manganese sulfate) were added to the reaction product at 8.0 L/hr, and ammonia water was added to the reaction product at 1.0 L/hr. NaOH was also added thereto to maintain the pH. Here, the pH in the reactor was maintained in a range of 10.0 to 11.0 and lower than in the second step. Under this condition, the reaction was carried out for 6 hours. After performing the reaction, the slurry solution in the reactor was filtered and washed with high-purity distilled water. Then, the result was dried in a hot air oven for 24 hours, thereby preparing a nickel-based active material precursor ($Ni_{0.6}Co_{0.2}Mn_{0.2}(OH)_2$).

Preparation Example 2

Preparation of Nickel-Based Active Material Precursor

A nickel-based active material precursor ($Ni_{0.6}Co_{0.2}Mn_{0.2}(OH)_2$) was prepared in the same manner as in Preparation Example 1, except that conditions for the preparation process were changed such that the nickel-based active material precursor had porosity characteristics as shown in Table 1.

Comparative Preparation Example 1

Preparation of Nickel-Based Active Material Precursor

Ammonia water at a concentration of 0.35 mol/L was added to a reactor at a stirring rate of 250 rpm and at a reaction temperature of 50° C. Metal raw materials at a rate of 6.00 L/hr and ammonia water at a rate of 0.6 L/hr were added thereto simultaneously and NaOH was also added thereto to control the pH. The pH in the reactor was controlled to be in a range of 11.3 to 11.4. The reaction was carried out for 33 hours and the reaction product was collected.

After washing the reaction product, the result was dried in a hot air oven for 24 hours at a temperature of 150° C., thereby preparing a nickel-based active material precursor ($Ni_{0.6}Co_{0.2}Mn_{0.2}(OH)_2$).

In Comparative Preparation Example 1, a reaction apparatus was used in which the product was discharged from the reactor to the outside.

Comparative Preparation Example 2

Preparation of Nickel-Based Active Material Precursor

Ammonia water at a concentration of 0.50 mol/L was added to a reactor at a stirring rate of 250 rpm and at a reaction temperature of 50° C. Metal raw materials at a rate of 6.00 L/hr and ammonia water at a rate of 0.9 L/hr were added thereto simultaneously and NaOH was also added thereto to control the pH. The pH in the reactor was controlled to be in a range of 11.4 to 11.6. After washing the reaction product, the result was dried in a hot air oven for 24 hours at a temperature of 150° C., thereby preparing a nickel-based active material precursor ($Ni_{0.6}Co_{0.2}Mn_{0.2}(OH)_2$).

Comparative Preparation Example 3

Preparation of Nickel-Based Active Material Precursor

Comparative Preparation Example 3 was performed in the same manner as in Preparation Example 2, except that the pH in the first step was in a range of 10.10 to 10.20, the pH in the second step was in a range of 10.65 to 10.75, and the pH in the third step was in a range of 11.30 to 11.50.

When performing Comparative Preparation Example 3, it was difficult to obtain a nickel-based active material precursor having the desired size and structure due to the formation of fine particles.

Example 1

Preparation of Nickel-Based Active Material

The composite metal hydroxide ($Ni_{0.6}Co_{0.2}Mn_{0.2}(OH)_2$), i.e., the nickel-based active material precursor prepared in Preparation Example 1 and lithium hydroxide (LiOH) were mixed at a molar ratio of 1:1. Then, the mixture was subjected to a primary heat treatment under an air atmosphere at a temperature of about 800° C. for 6 hours, thereby obtaining nickel-based active material ($LiNi_{0.6}Co_{0.2}Mn_{0.2}O_2$) secondary particles (i.e., nickel-based active material intermediates). The resulting secondary particles were crushed and subjected to secondary heat treatment under an oxygen atmosphere at a temperature of about 850° C. for 6 hours, thereby obtaining nickel-based active material ($LiNi_{0.6}Co_{0.2}Mn_{0.2}O_2$) secondary particles.

Example 2

Preparation of Nickel-Based Active Material

A nickel-based active material was prepared in the same manner as in Example 1, except that the nickel-based active material precursor prepared in Preparation Example 2 was used instead of the nickel-based active material precursor prepared in Preparation Example 1.

Comparative Examples 1 and 2

Preparation of Nickel-Based Active Materials

Nickel-based active material secondary particles were prepared in the same manner as in Example 1, except that the nickel-based active material precursors prepared in Preparation Examples 1 and 2 were respectively used instead of the nickel-based active material precursor prepared in Preparation Example 1.

Manufacture Example 1

Coin Half-Cell

The nickel-based active material ($LiNi_{0.6}Co_{0.2}Mn_{0.2}O_2$) secondary particles prepared in Example 1 were used as a positive active material to prepare a coin half-cell as follows.

A mixture of 96 g of the nickel-based active material ($LiNi_{0.6}Co_{0.2}Mn_{0.2}O_2$) secondary particles prepared in Example 1, 2 g of polyvinylidene fluoride, 47 g of N-methyl pyrrolidone as a solvent, and 2 g of carbon black as a conductive agent were mixed by using a mixer to remove bubbles, thereby preparing a slurry for forming a positive active material layer in which the mixture was homogeneously dispersed.

The slurry for forming a positive electrode active material layer was coated onto an aluminum foil using a doctor blade to form a thin plate. The thin plate was dried at 135° C. for 3 hours or more, pressed, and dried in a vacuum to prepare a positive electrode.

The positive electrode and a lithium metal counter electrode were used to prepare a 2032-type coin half-cell, A separator formed of a porous polyethylene (PE) film and having a thickness of about 16 μm was disposed between the positive electrode and the lithium metal counter electrode, and an electrolyte was injected thereinto to prepare a 2032-type coin half-cell. Here, the electrolyte was a solution of 1.1 M $LiPF_6$ dissolved in a mixed solvent of ethylene carbonate (EC) and ethyl methyl carbonate (EMC) in a volume ratio of 3:5.

Manufacture Example 2

Coin Half-Cell

A coin half-cell was prepared in the same manner as in Manufacture Example 1, except that the nickel-based active material prepared in Example 2 was used instead of the nickel-based active material prepared in Example 1.

Comparative Manufacture Examples 1 and 2

Preparation of Coin Half-Cell

Lithium secondary batteries were prepared in the same manner as in Manufacture Example 1, except that the nickel-based active materials prepared in Comparative Examples 1 and 2 were respectively used instead of the nickel-based active material prepared in Example 1.

Evaluation Example 1

Scanning Electron Microscope (SEM) Analysis

Preparation Examples 1 and 2 and Comparative Preparation Example 1

SEM analysis was performed on cross-sections of the nickel-based active material precursor particles prepared in Preparation Examples 1 and 2 and Comparative Preparation Example 1. As a scanning electron microscope, a Magellan 400L (FE! Company) was used. The cross-sections of the samples were milled using CP2 available from JEOL Ltd. at 6 kV, with 150 µA, for 4 hours to perform pretreatment. The SEM analysis was performed at 350 V.

The cross-sections of the active material precursor particles were subjected to the SEM analysis. Through the SEM analysis, the porosities thereof were measured, which are shown in Tables 1 and 2. Table 1 shows the porosities of the nickel-based active material precursor particles prepared in Preparation Example 1, Preparation Example 2, and Comparative Preparation Example 1.

Referring to the results of the SEM analysis, since a porous layer was formed on a surface according to Preparation Example 1, the nickel-based active material precursor primary particles were very thin and had many pores. After sintering, the primary particles became smaller, and the surface became more porous, thus increasing efficiency.

TABLE 1

| | Porosity (vol %) | | |
|---|---|---|---|
| Examples | Preparation Example 1 | Preparation Example 2 | Comparative Preparation Example 1 |
| Core | 15.87% | 8% | 3.56% |
| Dense intermediate layer | 4.50% | 4.03% | 2.43% |
| Shell | 30.90% | 15.18% | 3.25% |

Referring to Table 1, the nickel-based active material precursors of Preparation Example 1 and 2 had higher porosities in a shell area than in a core area, as compared with Comparative Preparation Example 1. However, the structure showed that a dense layer having few pores between the core area and the shell area accounted for an area of 25% to 35% of a diameter of each active material precursor. In addition, in the shell area of the nickel-based active material precursor of Preparation Example 1, a porous layer that had a thickness of about 1.0 µm and a porosity of about 30% was present. In addition, in the shell area of the nickel-based active material precursor of Preparation Example 2, a porous layer that had a thickness of about 2.0 µm was present.

Evaluation Example 2

Paricle Size Analysis

The nickel-based active material precursors prepared in Preparation Example 1 and Comparative Preparation Examples 1 and 2 were subjected to particle size analysis. The results of the particle size analysis are shown in Table 2.

TABLE 2

| Examples | D10 (µm) | D50 (µm) | D90 (µm) |
|---|---|---|---|
| Preparation Example 1 | 9.34 | 11.70 | 14.46 |
| Preparation Example 2 | 10.42 | 12.34 | 14.19 |
| Comparative Preparation Example 1 | 10.35 | 11.99 | 13.70 |
| Comparative Preparation Example 2 | 10.11 | 12.18 | 14.19 |

D10, D50, and D90 in Table 2 refer to diameters corresponding to 10%, 50%, and 90%, respectively, in a cumulative volume distribution of particle diameters in order from the smallest particle.

Evaluation Example 3

Specific Surface Area

The BET specific surface areas of the nickel-based active material precursors prepared in Preparation Examples 1 and 2 and Comparative Preparation Examples 1 and 2 were measured and are shown in Table 3.

TABLE 3

| Examples | BET specific surface area ($m^2/g$) |
|---|---|
| Preparation Example 1 | 9.68 |
| Preparation Example 2 | 8.42 |
| Comparative Preparation Example 1 | 2.43 |
| Comparative Preparation Example 2 | 3.40 |

Referring to Table 3, the nickel-based active material precursors prepared in Preparation Examples 1 and 2 had a high specific surface area and an increased BET specific surface area, as compared with the nickel-based active material precursors of Comparative Preparation Examples 1 and 2.

Evaluation Example 4

Composition Analysis

The compositions of the nickel-based active material precursors prepared in Preparation Example 1 and Comparative Preparation Examples 1 and 2 were analyzed by using ICP. The results thereof are shown in Table 4.

TABLE 4

| mol(%) | Preparation Example 1 | Comparative Preparation Example 1 | Comparative Preparation Example 2 |
|---|---|---|---|
| Ni (mol %) | 0.606 | 0.607 | 0.610 |
| Co (mol %) | 0.198 | 0.197 | 0.195 |
| Mn (mol %) | 0.196 | 0.196 | 0.195 |

Referring to the results shown in Table 4, a molar ratio of nickel to cobalt to manganese was about 6:2:2 in the nickel-based active material precursors prepared in Preparation Example 1 and Comparative Preparation Examples 1 and 2.

Evaluation Example 5

Initial Charge/Discharge Efficiency (I.C.E)

The coin half-cells prepared in Manufacture Examples 1 and 2 and Comparative Manufacture Examples 1 and 2 were charged and discharged once with a current of 0.1 C for formation. The charging was initiated in a constant current (CC) mode, then continued in a constant voltage (CV) mode, and cut off at a current of 0.05 C while maintaining 4.30 V. The discharging was performed in a constant current (CC) mode and cut off at a voltage of 3.0 V.

I.C.E was measured following Equation 1, and the results thereof are shown in Table 5.

Initial charge/discharge efficiency[%]=[$1^{st}$ cycle discharge capacity/$1^{st}$ cycle charge capacity]×100          Equation 1

TABLE 5

| Examples | Charge capacity (mAh/g) | Discharge capacity (mAh/g) | I.G.E (%) |
|---|---|---|---|
| Manufacture Example 1 | 198.2 | 188.8 | 95.2 |
| Manufacture Example 2 | 198.0 | 189.7 | 95.8 |
| Comparative Manufacture Example 1 | 200.0 | 180.9 | 90.5 |
| Comparative Manufacture Example 2 | 198.3 | 185.6 | 93.6 |

Referring to the results of Table 5, the coin half-cells prepared in Manufacture Examples 1 and 2 were found to have improved charge/discharge efficiency (initial characteristics) at 0.1 C, as compared with Comparative Manufacture Examples 1 and 2.

Evaluation Example 6

Charge/Discharge Characteristics (Rate Capability)

The rate capability of each of the coin half-cells prepared in Manufacture Examples 1 and 2 and Comparative Manufacture Examples 1 and 2 was evaluated by the following method.

Each of the coin half-cells prepared in Manufacture Examples 1 and 2 and Comparative Manufacture Example 1 and 2 was charged under a condition of a constant current of 0.2 C and a constant voltage of 4.3 V (cut-off at 0.05 C). Then, each of the coin half-cells was rested for about 10 minutes. Subsequently, each of the coin half-cells was discharged under a condition of a constant current of 0.2 C, ⅓ C, 0.5 C, 1 C, 2 C, or 3 C until the voltage of 3.0 V was reached. That is, as the number of charge/discharge cycles increased, the discharge rate was changed to 0.2 C, ⅓ C, 0.5 C, 1 C, 2 C, or 3 C periodically in order to evaluate high-rate discharge characteristics (also referred to as rate capability) of each of the coin half-cells. Yet, in the first to third charge/discharge cycles, each cell was discharged at a rate of about 0.1 C.

The rate capability of each coin half-cell was defined by the following Equation 2. The discharge results of 0.2 C and 1 C are shown in Table 6:

Rate capability (%)=(Discharge capacity upon discharge of a cell at a rate of a given constant current)/(Discharge capacity upon discharge of a cell at a rate of 0.1 C)×100          Equation 2

TABLE 6

|  | Rate capacity (@ 0.2 C/0.1 C) | Rate capacity (@ 1.0 C/0.1 C) |
|---|---|---|
| Manufacture Example 1 | 98.7% (185.8 mAh/g) | 91.9% (176.0 mAh/g) |
| Comparative Manufacture Example 1 | 98.2% (178.2 mAh/g) | 90.5% (167.8 mAh/g) |
| Comparative Manufacture Example 2 | 98.6% (182.1 mAh/g) | 91.1% (171.1 mAh/g) |

Referring to the results of Table 6, the coin half-cell prepared in Manufacture Example 1 was found to have excellent rate capability, as compared with the coin half-cells prepared in Comparative Manufacture Examples 1 and 2.

Evaluation Example 7

Lifespan Characteristics at High Temperature

The lifespan characteristics at high temperature of each of the coin half-cells prepared in Manufacture Examples 1 and 2 and Comparative Manufacture Examples 1 and 2 were evaluated by the following method.

Each of the coin half-cells prepared in Manufacture Example 1 and Comparative Manufacture Examples 1 and 2 were charged and discharged once at 0.1 C for formation. Then, each coin half-cell was charged and discharged once at 0.2 C to test initial charging and discharging characteristics. Subsequently, this cycle was repeated 45 to 50 times at 1 C to identify cycle characteristics. The charging was initiated in a CC mode, continued in a CV mode, and cut off at 4.3 V with a current of 0.05 C, and the discharging was performed in a CC mode and cut off at 3.0 V. The discharge capacity change was tested by repeating the cycle, the lifespan was calculated by the following Equation 3, and the results thereof are shown in Table 7.

Lifespan (%)=(discharge capacity after performing the 50th cycle/discharge capacity after performing the 1st cycle)×100          Equation 3

TABLE 7

| Examples | Lifespan (%) |
|---|---|
| Manufacture Example 1 | 99.8 |
| Manufacture Example 2 | 98.7 |
| Comparative Manufacture Example 1 | 97.3 |
| Comparative Manufacture Example 2 | 98.5 |

Referring to Table 7, the coin half-cells of Manufacture Examples 1 and 2 were found to have improved lifespan characteristics, as compared with the coin half-cells of Comparative Manufacture Examples 1 and 2.

While the present disclosure has been particularly shown and described with reference to exemplary embodiments thereof, it is to be understood that the disclosure is not limited to the exemplary embodiments and is intended to cover various modifications and equivalent embodiments included within the spirit and scope of the appended claims.

Accordingly, the scope of the present disclosure should be determined by the appended claims.

The invention claimed is:

1. A nickel-based active material precursor for a lithium secondary battery, the nickel-based active material precursor comprising:
   a porous core,
   a porous shell disposed on the porous core,
   and a dense intermediate layer disposed between the porous core and the porous shell,
   wherein a porosity of the porous shell is greater than a porosity of the porous core, and a porosity of the dense intermediate layer is lower than the porosity of the porous core and the porosity of the porous shell.

2. The nickel-based active material precursor of claim 1, wherein the porosity of the dense intermediate layer is 5 percent (%) or less.

3. The nickel-based active material precursor of claim 1, wherein the dense intermediate layer and the porous shell each have a radially arranged structure.

4. The nickel-based active material precursor of claim 1, wherein the porosity of the porous shell is greater than 15% and 35% or less.

5. The nickel-based active material precursor of claim 1, wherein the porosity of the core is in a range of 8% to 16%.

6. The nickel-based active material precursor of claim 1, wherein a thickness of the porous shell comprises an irregular porous layer of a thickness of 2 μm or less.

7. The nickel-based active material precursor of claim 1, wherein the nickel-based active material precursor comprises plate particles, and a major axis of the plate particles is arranged in a radial direction.

8. The nickel-based active material precursor of claim 1, wherein a specific surface area of the nickel-based active material precursor is 8 square meters per gram (m$^2$/g) or greater.

9. The nickel-based active material precursor of claim 1, wherein the nickel-based active material precursor is a compound represented by Formula 1:

$$Ni_{1-x-y-z}Co_xMn_yM_z(OH)_2 \qquad \text{Formula 1}$$

wherein, in Formula 1, M is an element selected from the group consisting of boron (B), magnesium (Mg), calcium (Ca), strontium (Sr), barium (Ba), titanium (Ti), tungsten (W), vanadium (V), chromium (Cr), iron (Fe), copper (Cu), zirconium (Zr), and aluminum (Al), and

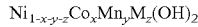

$x \leq (1-x-y-z), y \leq (1-x-y-z), 0 < x < 1, 0 \leq y < 1,$ and $0 \leq z < 1$.

10. The nickel-based active material precursor of claim 1, wherein the nickel-based active material precursor is $Ni_{0.6}Co_{0.2}Mn_{0.2}OH$, $Ni_{0.5}Co_{0.2}Mn_{0.3}OH$, $Ni_{1/3}Co_{1/3}Mn_{1/3}OH$, $Ni_{0.8}Co_{0.1}Mn_{0.1}OH$, or $Ni_{0.85}Co_{0.1}Al_{0.05}OH$.

11. A nickel-based active material for a lithium secondary battery, obtained from the nickel-based active material precursor for a lithium secondary battery according to claim 1.

12. A lithium secondary battery comprising a positive electrode that comprises the nickel-based active material for a lithium secondary battery according to claim 11; a negative electrode; and an electrolyte between the positive electrode and the negative electrode.

13. A method of preparing a nickel-based active material precursor for a lithium secondary battery, the method comprising:
    a first step of forming a porous core;
    a second step of forming a dense intermediate layer on the porous core formed in the first step; and
    after removing a portion of a reaction product obtained in the second step to dilute the reaction product, a third step of forming a porous shell on the reaction product on which the dense intermediate layer is formed.

14. The method of claim 13, wherein a pH and a stirring power of the reaction mixture gradually decreases from the first step to the second step and from the second step to the third step.

15. The method of claim 13, wherein in the first step, the second step, and the third step, a reaction temperature is in a range of 40° C. to 60° C., a stirring power is in a range of 0.5 kilowatts per cubic meter (kW/m$^3$) to 6.0 kW/m$^3$, and a pH is controlled to be in a range of 10 to 12.

* * * * *